US008335074B2

(12) United States Patent
Liu et al.

(10) Patent No.: US 8,335,074 B2
(45) Date of Patent: Dec. 18, 2012

(54) PORTABLE ELECTRONIC DEVICE AND REPOSITIONING METHOD FOR SAME

(75) Inventors: Tzu-Yuan Liu, Tu-Cheng (TW);
Hsin-Yung Yang, Tu-Cheng (TW);
Ching-Min Lin, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 130 days.

(21) Appl. No.: 13/048,897

(22) Filed: Mar. 16, 2011

(65) Prior Publication Data

US 2012/0033372 A1    Feb. 9, 2012

(30) Foreign Application Priority Data

Aug. 5, 2010    (TW) .............................. 99126016 A

(51) Int. Cl.
*G06F 1/16*    (2006.01)
*H05K 5/00*    (2006.01)
*H05K 7/00*    (2006.01)

(52) U.S. Cl. ................................. 361/679.3; 361/679.02
(58) Field of Classification Search ............. 361/679.02, 361/679.3; 455/575.1–575.4; 248/917–922
See application file for complete search history.

(56) References Cited

U.S. PATENT DOCUMENTS

| | | | | |
|---|---|---|---|---|
| 5,758,267 A * | 5/1998 | Pinder et al. | ................ | 455/90.2 |
| 6,144,550 A * | 11/2000 | Weber et al. | ............. | 361/679.26 |
| 6,402,109 B1 * | 6/2002 | Dittmer | ...................... | 248/284.1 |
| 6,915,878 B2 * | 7/2005 | Kamen et al. | ................ | 182/141 |
| 6,928,300 B1 * | 8/2005 | Skinner et al. | ............. | 455/556.2 |
| 7,002,553 B2 * | 2/2006 | Shkolnikov | ................... | 345/169 |
| 7,296,774 B2 * | 11/2007 | Oh | ................ | 248/324 |
| 7,519,404 B2 * | 4/2009 | Lonka et al. | ............... | 455/575.4 |
| 7,545,108 B2 * | 6/2009 | Flessas | ........................ | 318/101 |
| D613,716 S * | 4/2010 | Liu | ......................... | D14/138 G |
| 7,744,331 B2 * | 6/2010 | Ellis et al. | .................... | 414/476 |
| 7,760,183 B2 * | 7/2010 | Grady et al. | ................. | 345/156 |
| 7,830,460 B2 * | 11/2010 | Ido | ................. | 348/837 |
| 8,031,463 B2 * | 10/2011 | Yukawa et al. | .......... | 361/679.21 |
| 8,095,191 B2 * | 1/2012 | Gorsica et al. | ............ | 455/575.3 |
| 2001/0022719 A1 * | 9/2001 | Armitage et al. | ............ | 361/681 |
| 2004/0263479 A1 * | 12/2004 | Shkolnikov | ................... | 345/169 |
| 2005/0121866 A1 * | 6/2005 | Kamen et al. | ............... | 280/47.18 |
| 2006/0104633 A1 * | 5/2006 | Kenoyer et al. | ............... | 396/428 |
| 2006/0198094 A1 * | 9/2006 | Kano et al. | .................... | 361/683 |
| 2007/0123309 A1 * | 5/2007 | Sano et al. | .................... | 455/566 |
| 2007/0169977 A1 * | 7/2007 | Ellis et al. | .................... | 180/170 |
| 2007/0177339 A1 * | 8/2007 | Flessas | ........................ | 361/681 |
| 2008/0013264 A1 * | 1/2008 | Ido | ................. | 361/681 |
| 2008/0137913 A1 * | 6/2008 | Hildreth | ....................... | 382/107 |
| 2008/0158801 A1 * | 7/2008 | Mathews | ..................... | 361/681 |
| 2009/0168312 A1 * | 7/2009 | Motoe et al. | ............. | 361/679.01 |
| 2009/0237873 A1 * | 9/2009 | Flessas | ................... | 361/679.01 |
| 2010/0057359 A1 * | 3/2010 | Caballero et al. | ............ | 701/214 |
| 2010/0190607 A1 * | 7/2010 | Widerman et al. | ................. | 482/1 |
| 2010/0232100 A1 * | 9/2010 | Fukuma et al. | .......... | 361/679.01 |
| 2011/0037260 A1 * | 2/2011 | Sadarnac et al. | .................. | 290/7 |
| 2011/0074974 A1 * | 3/2011 | Hildreth | ...................... | 348/222.1 |
| 2011/0204592 A1 * | 8/2011 | Johansen et al. | ........... | 280/304.1 |
| 2011/0216064 A1 * | 9/2011 | Dahl et al. | .................... | 345/428 |
| 2012/0024648 A1 * | 2/2012 | Liu et al. | ....................... | 188/378 |
| 2012/0092820 A1 * | 4/2012 | Hautamaki et al. | ...... | 361/679.02 |

* cited by examiner

*Primary Examiner* — Adrian S Wilson
(74) *Attorney, Agent, or Firm* — Altis Law Group, Inc.

(57) ABSTRACT

Tilt of a portable electronic device can be set by determining tilt of the portable electronic device. A predetermined tilt angle can be set for the portable electronic device, in which a tilt sensor of the portable electronic device continually detects a current tilt angle of the portable electronic device, where the device is repositioned accordingly.

15 Claims, 6 Drawing Sheets

PORTABLE ELECTRONIC DEVICE AND REPOSITIONING METHOD FOR SAME

BACKGROUND

1. Technical Field

Embodiments of the present disclosure relate to control methods of an electronic device, and more particularly to a method for repositioning a portable electronic device and portable electronic device using the same.

2. Description of Related Art

Currently, portable electronic devices feature a wide range of functions for communications, entertainment, and information exchange. Such devices include mobile phones, PDA (personal digital assistant, personal digital assistants), handheld game consoles and digital cameras. However, most of these devices can only rest on a supporting surface, such as a table. To reposition the device vertically, special tools such as a stand are required, and the repositioning must be accomplished manually.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, such as, for example, Java, C, or Assembly. One or more software instructions in the module may be embedded in firmware, such as an EPROM. It will be appreciated that module may comprise connected logic units, such as gates and flip-flops, and may comprise programmable units, such as programmable gate arrays or processors. The module described herein may be implemented as either software and/or hardware module and may be stored in any type of computer-readable medium or other computer storage device.

A portable electronic device 1 is generally controlled and coordinated by an operating system software, such as UNIX, LINUX, WINDOWS, MAC OS X, an embedded operating system, or any other compatible operating systems. In other embodiments, the portable electronic device 1 may be controlled by a proprietary operating system. Conventional operating systems control and schedule computer processes for execution, perform memory management, provide file system, networking, and I/O services, and provide a user interface, such as a graphical user interface (GUI), among other things.

Figure 1:
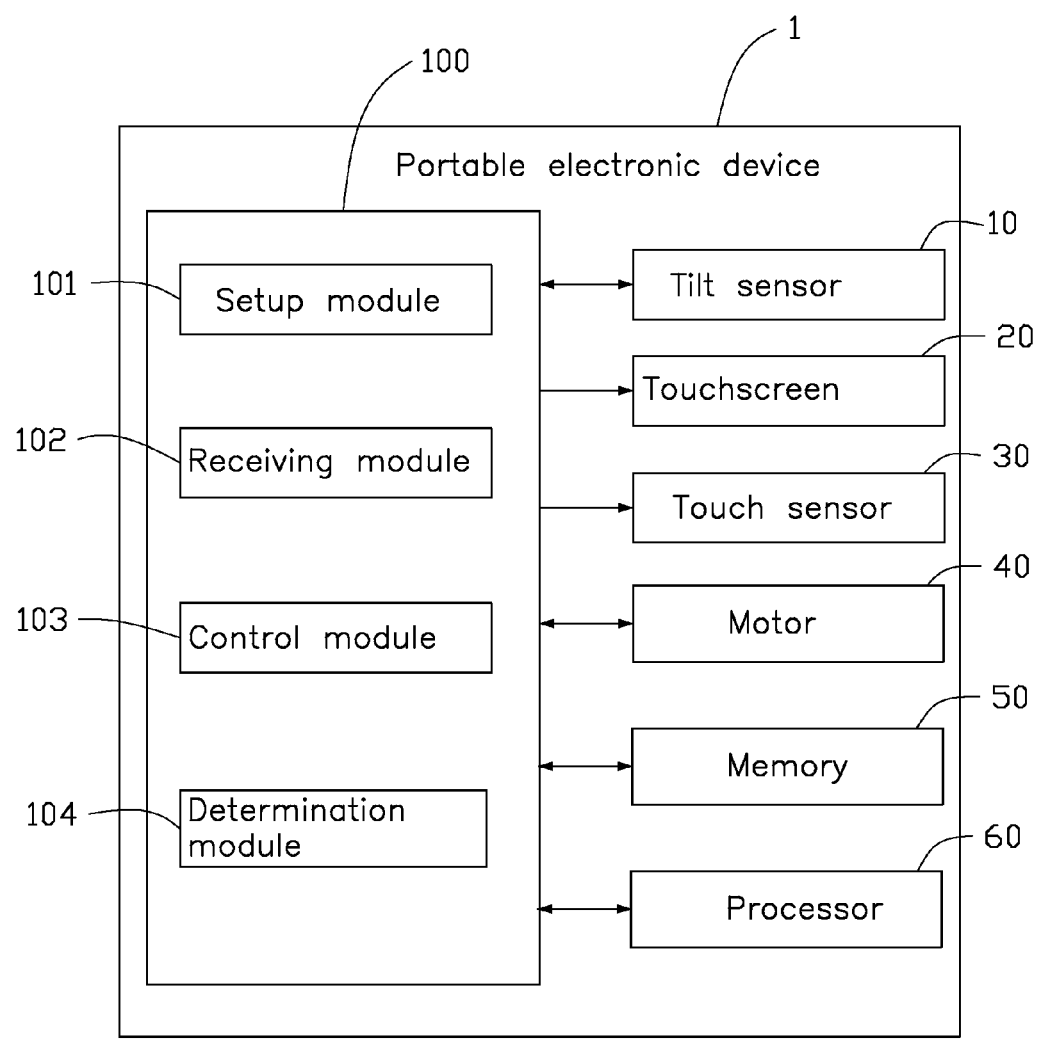
FIG. 1 is a block diagram of one embodiment of a portable electronic device.

FIG. 1 is a block diagram of one embodiment of the portable electronic device 1. Depending on the embodiment, the portable electronic device 1 may be a mobile phone, a personal digital assistant (PDA), a handheld game console, a digital camera (DC), a handheld computer, or other device. The portable electronic device 1 includes a system 100, a tilt sensor 10, a touchscreen 20, a touch sensor 30, a motor 40, a memory 50, at least one processor 60 and one or more programs including a setup module 101, a receiving module 102, a control module 103 and a determination module 104. The system 100 can set a predetermined tilt angle of the portable electronic device 1 for repositioning the portable electronic device 1.

Figure 2:
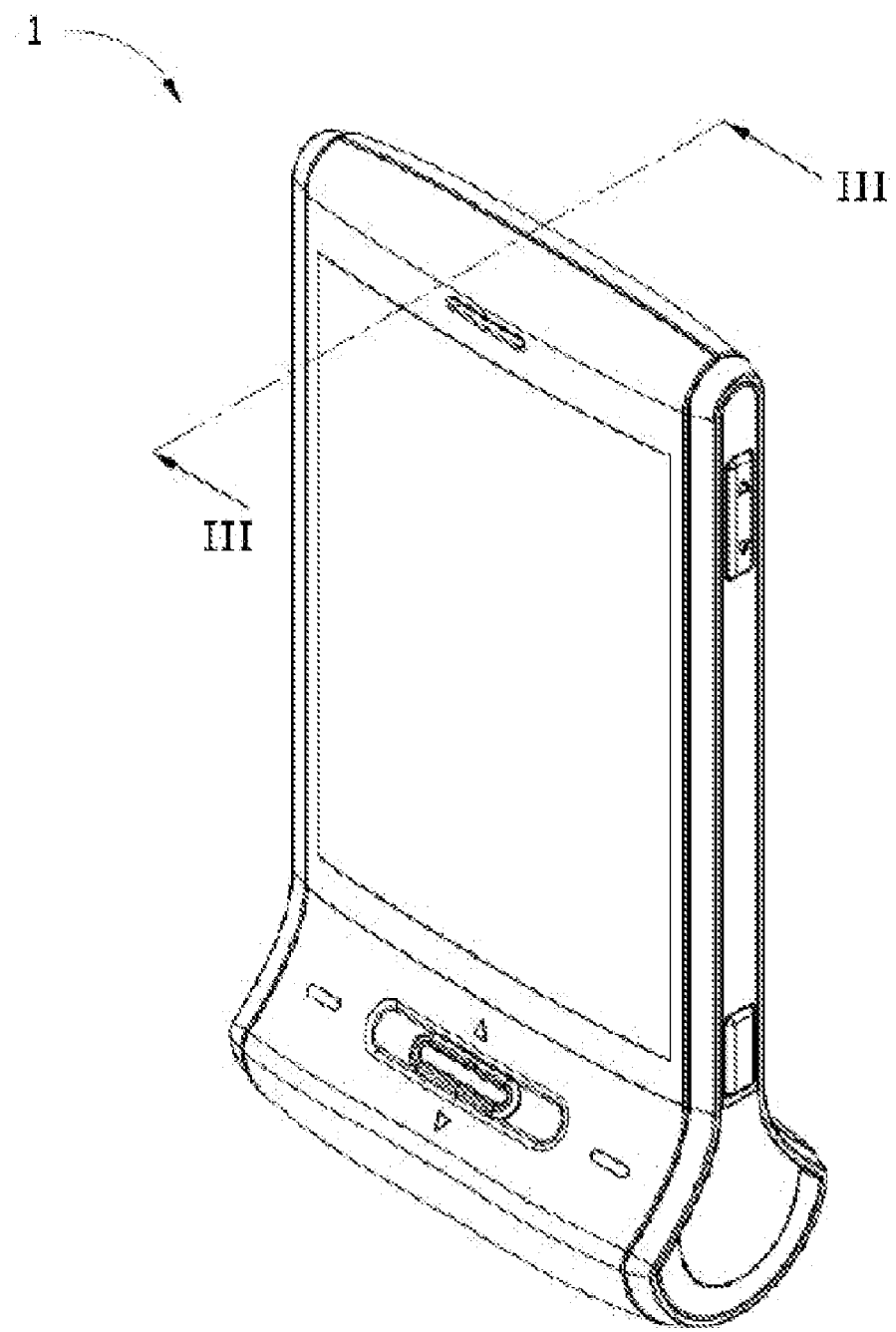
FIG. 2 is a schematic diagram of the portable electronic device of FIG. 1.

FIG. 2 shows a schematic diagram of the portable electronic device 1. A reference line III is a line to represent a repositioning direction of the portable electronic device 1.

Figure 3:
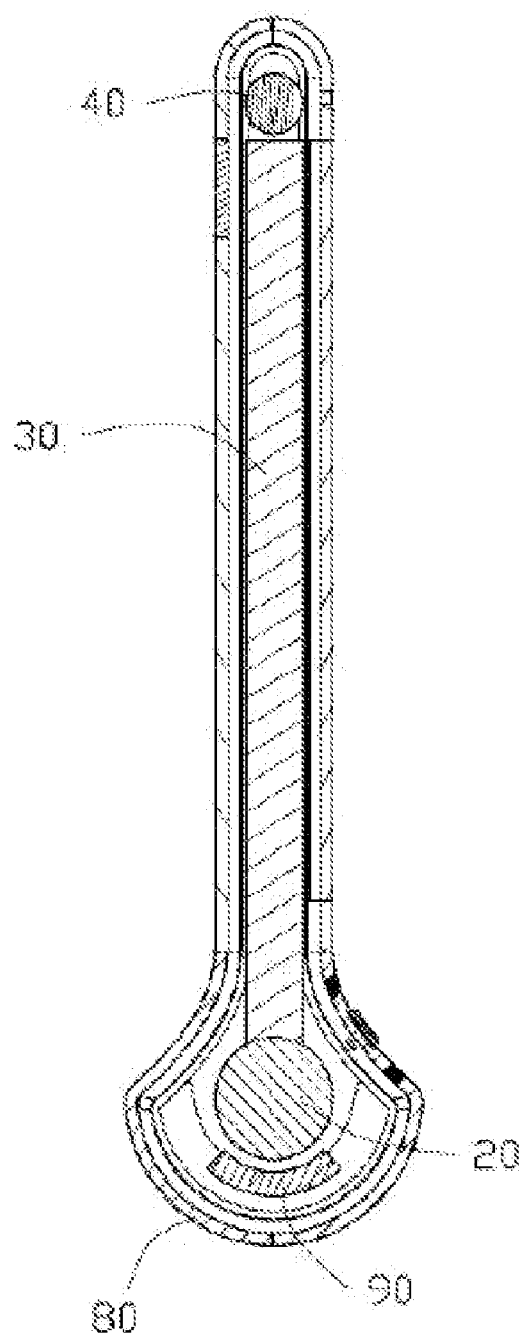
FIG. 3 is a side view of the portable electronic device of FIG. 1 in a static state.

FIG. 3 is a side view of the portable electronic device 1 in a static state. The portable electronic device 1 includes the tilt sensor 10, the touchscreen 20, the motor 40 and the weight block 90. The portable electronic device 1 has a rocker base 80.

The tilt sensor 10 is operable to detect a current tilt angle of the portable electronic device 1. In one embodiment, the tilt sensor 10 is installed in an upper portion to the touchscreen 20 of the portable electronic device 1. Accordingly, the tilt sensor 10 installed in the upper portion can detect the current tilt angle of the portable electronic device 1.

The touchscreen 20 is operable to display information of the portable electronic device 1 and receive touch input to the touchscreen 20. In one embodiment, the touchscreen 20 can receive the input to set the predetermined tilt angle of the portable electronic device 1. The touchscreen 20 can be a resistive or a capacitive touchscreen.

The touch sensor 30 is operable to detect at least one contact (e.g., stylus or finger) on the touchscreen 20 and generate at least one coordinate value according to the at least one contact. For example, the touchscreen 20 can be contacted in two simultaneous locations, causing the touch sensor 30 to detect the two simultaneous contacts from the touchscreen 20 and generate two coordinate values to the system 100.

Figure 4:
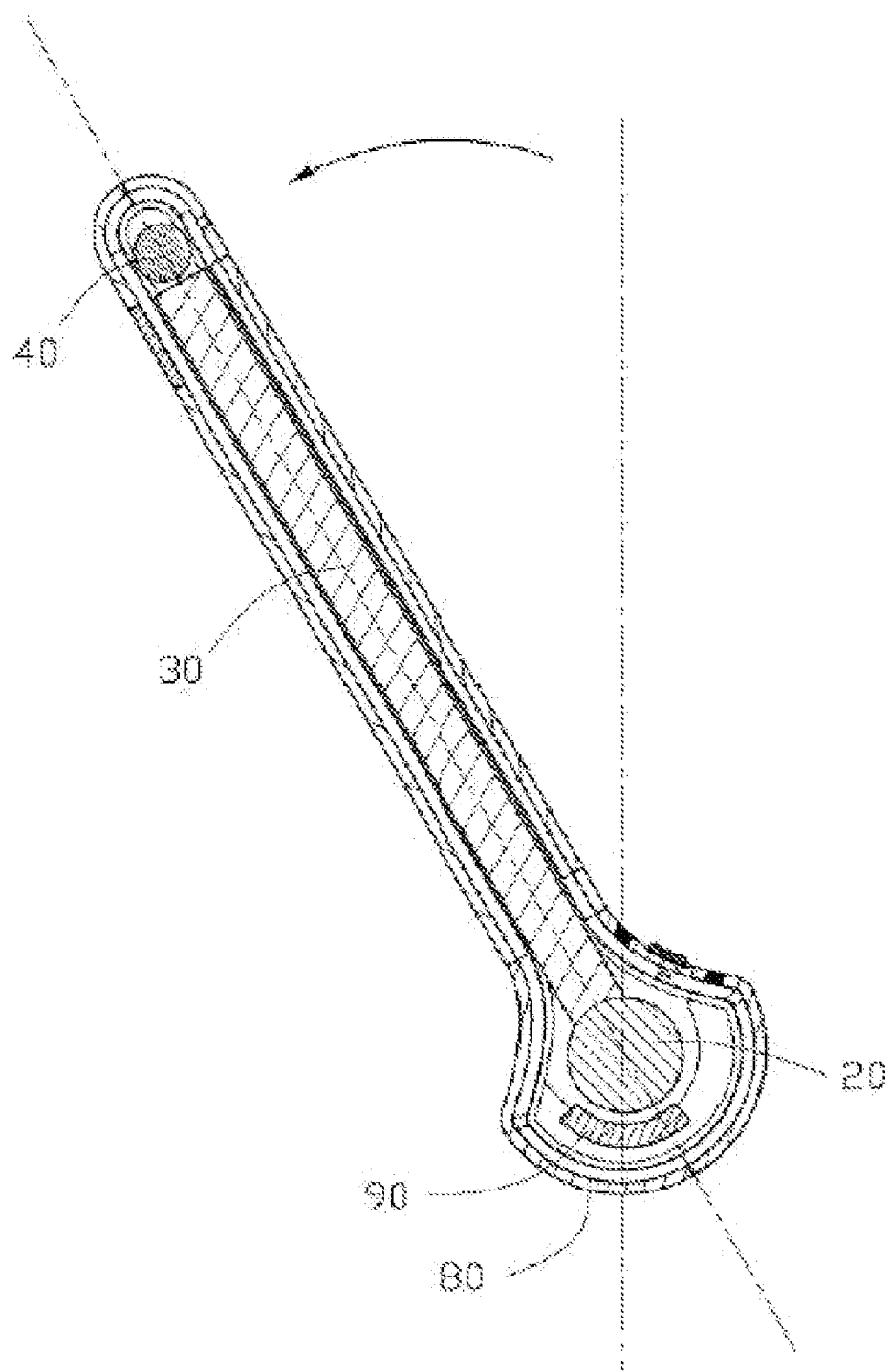
FIG. 4-5 are side views of the portable electronic device of FIG. 1 in a repositioning state.

The motor 40 is operable to generate a tilting force to reposition the portable electronic device 1. In one embodiment, the motor 40 is a stepper motor. As shown in FIG. 4, the rocker base 80 includes the motor 40 and the weight block 90. The motor 40 is located within the rocker base 80 of the portable electronic device 1. In one embodiment, when the motor 40 receives a control signal form the control module 103, the motor 40 then generates the tilting force to reposition the portable electronic device 1. As shown in FIG. 4, the motor 40 rotates in a clockwise direction to generate a counterclockwise tilting force to reposition the portable electronic device 1 in the forward direction.

The memory 50 is electronically connected to the tilt sensor 10, the touchscreen 20, the touch sensor 30, the motor 40, the at least one processor 60, the setup module 101, the receiving module 102, the control module 103 and the determination module 104. The memory 50 is operable to store many kinds of data, such as the predetermined tilt angle, the current tilt angle of the portable electronic device 1 from the tilt sensor 10, a customization function code of the portable electronic device 1, computerized codes of the system 10, programs of an operating system and other applications of the portable electronic device 1. The memory 50 may include a hard disk drive, flash memory, RAM, ROM, cache, or external storage mediums.

The modules 101-104 may comprise computerized code in the form of one or more programs that are stored in the memory 50. The computerized code includes instructions that are executed by the at least one processor 60 to provide functions for modules 101-104. The at least one processor 60, as an example, may include a CPU, math coprocessor, shift register, for example.

The receiving module 102 is operable to receive the current tilt angle of the portable electronic device 1 detected by the tilt sensor. Furthermore, the receiving module 102 saves the received information in the memory 50.

The setup module 101 is operable to set the predetermined tilt angle of the portable electronic device 1. In one embodiment, if a current tilt angle is confirmed as the predetermined tilt angle of the portable electronic device 1, the setup module 101 then sets the current tilt angle from the receiving module 102 as the predetermined tilt angle.

Accordingly, the predetermined tilt angle of an operation mode of the portable electronic device 1 can be set by manual repositioning. For example, if the portable electronic device 1 is repositioned to a 30° tilt angle in the forward direction, and the touchscreen 20 is contacted to confirm setting of the 30° tilt angle, the predetermined tilt angle is set as 30° in the forward direction.

Repositioning of the portable electronic device 1 can alternatively be made in a backward direction. The portable electronic device 1 may be preset to reposition itself automatically and increase output volume in outdoor environments. As shown in FIG. 2, "forward direction" refers to a direction facing the touchscreen 20 along the reference line III, and backward direction opposites to the touchscreen 20 along the reference line III.

Figure 5:
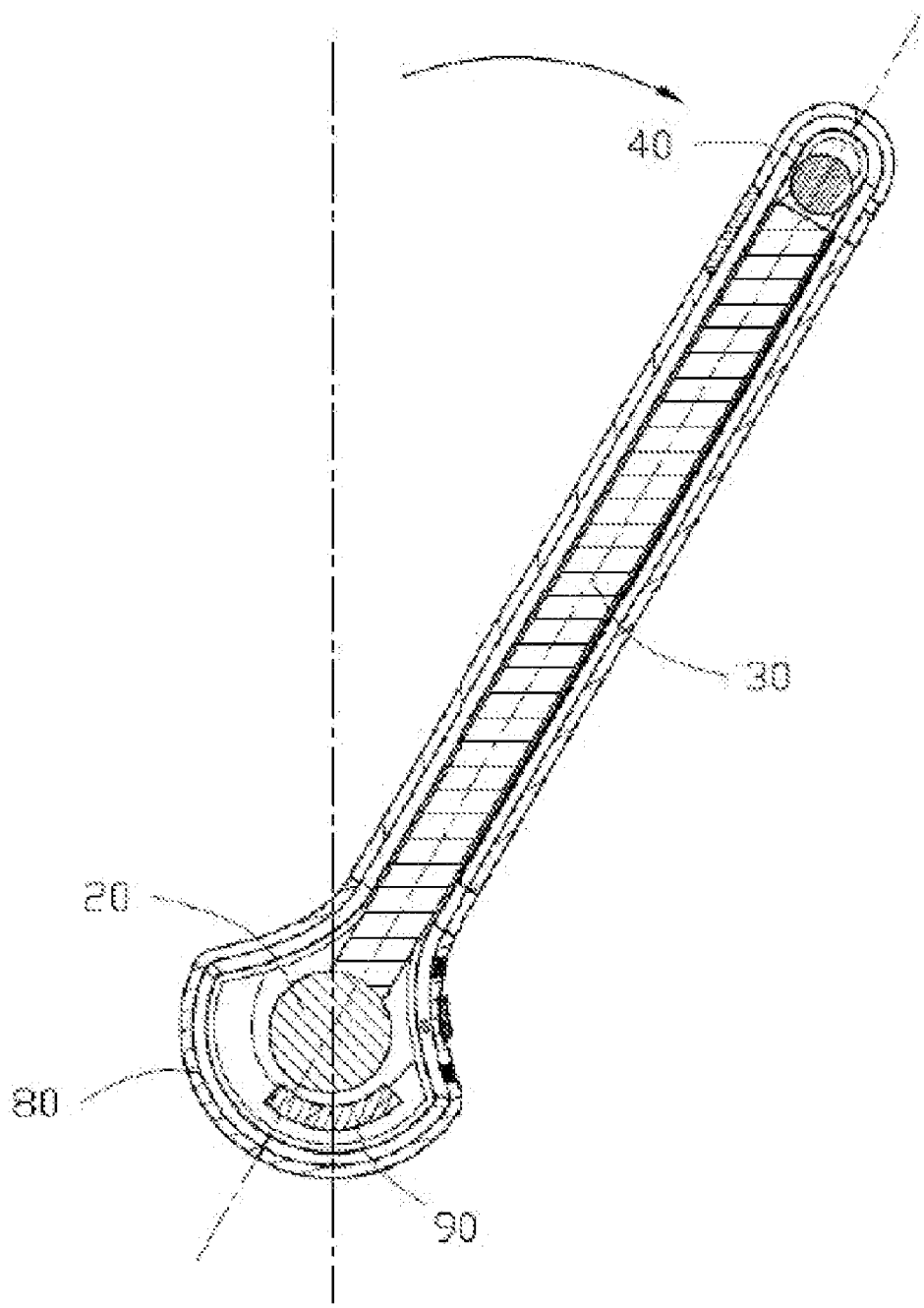

The control module 103 is operable to send a control signal to direct the motor 40 to reposition the portable electronic device 1 to a predetermined tilt angle or a predetermined tilt angle range. In one embodiment, if the control module 103 sends a counterclockwise control signal to the motor 40, the motor 40 rotates in a counterclockwise direction to generate a clockwise tilting force to reposition the portable electronic device 1 in the backward direction as shown in FIG. 5.

The determination module 104 is operable to generate a determination signal to the control module 103 to limit the tilt angle of the portable electronic device 1 to within a predetermined range. In one embodiment, the predetermined tilt angle of the portable electronic device 1 can be set as the 30° in the forward direction. When the receiving module 102 receives information that the current tilt angle is approaching 30°, the at least one processor 60 directs the determination module 104 to send the determination signal to the motor 40 to limit the repositioning to within the predetermined tilt angle.

Figure 6:
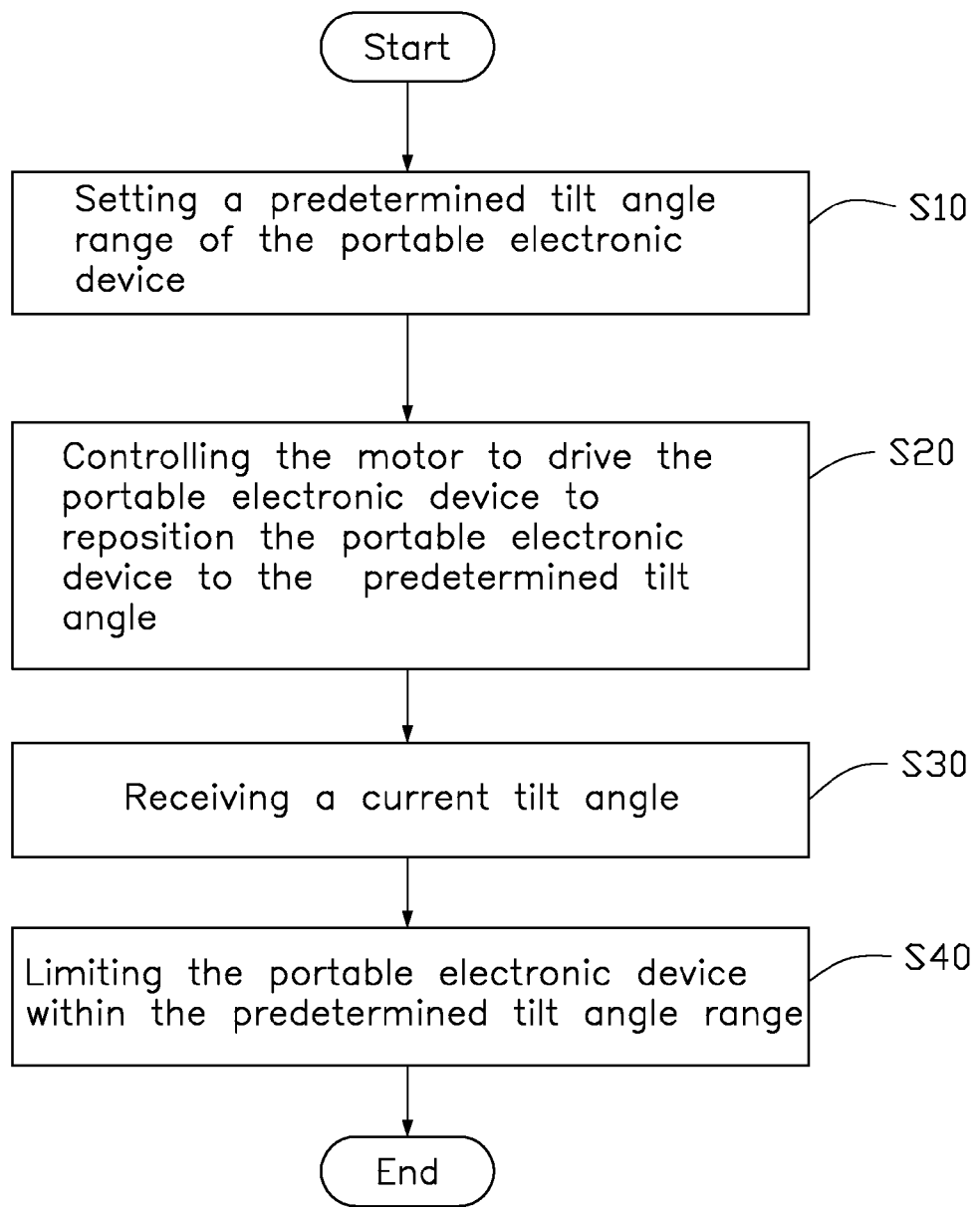
FIG. 6 is a flowchart of one embodiment of a method for repositioning a portable electronic device.

FIG. 6 is a flowchart of one embodiment of a method for repositioning a portable electronic device 1. Depending on the embodiment, additional blocks may be added, others deleted, and the ordering of the blocks may be changed.

In block S10, the setup module 101 sets a predetermined tilt angle of the portable electronic device 1. In one embodiment, contact with the touchscreen 20 confirms setting of a current tilt angle to the predetermined tilt angle.

In block S20, the motor 40 reposition the portable electronic device 1 to the predetermined tilt angle of the portable electronic device 1 upon receiving a control signal from the control module 103. In one embodiment, if the control module 103 sends a counterclockwise control signal to the motor 40, the motor 40 rotates in a counterclockwise direction to generate a clockwise tilting force to reposition the portable electronic device 1 in the backward direction.

In block S30, the receiving module 102 receives a current tilt angle of the portable electronic device 1 detected by the tilt sensor 10. The receiving module 102 further saves the received information in the memory 50.

In block S40, the determination module 104 limits the tilt angle of the portable electronic device 1 within the predetermined tilt angle. In one embodiment, when the receiving module 102 receives the current tilt angle is approaching the predetermined tilt angle, the at least one processor 60 directs the determination module 104 to send the determination signal to control the motor 40. The motor 40 then rotates in one direction to generate an anti tilting force to reposition the portable electronic device 1 within the predetermined tilt angle.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A portable electronic device, comprising:
   a memory;
   a touchscreen;
   at least one processor;
   a motor;
   a tilt sensor operable to detect a current tilt angle of the portable electronic device;
   one or more programs that are stored in the memory and are executed by the at least one processor, the one or more programs comprising:
   a setup module operable to set a predetermined tilt angle range of the portable electronic device;
   a receiving module operable to receive the current tilt angle of the portable electronic device detected by the tilt sensor;
   a control module operable to control the motor to drive the portable electronic device to reposition to the predetermined tilt angle or within a predetermined tilt angle range of the portable electronic device; and
   a determination module operable to limit the tilt angle of the portable electronic device to be within the predetermined tilt angle range.

2. The portable electronic device of claim 1, the device further comprising a touch sensor operable to generate at least one contact signal according to receive at least one contact on the touchscreen.

3. The portable electronic device of claim 1, the device further comprising a rocker base.

4. The portable electronic device of claim 1, wherein the tilt sensor is located in an upper portion of the touchscreen of the portable electronic device.

5. The portable electronic device of claim 1, wherein the portable electronic device is a mobile phone, personal digital assistant, personal digital assistant, handheld game console or digital camera.

6. A method for repositioning a portable electronic device, the portable electronic device comprising a touchscreen, a tilt sensor, a rocker base and a motor installed in the rocker base, the method comprising:
   setting a predetermined tilt angle range of the portable electronic device;
   controlling the motor to drive the portable electronic device to reposition the portable electronic device within the predetermined tilt angle range;
   receiving a current tilt angle of the portable electronic device by the tilt sensor; and
   limiting the tilt angle of the portable electronic device to be within the predetermined tilt angle range.

7. The method of claim 6, further comprising receiving at least one contact on the touchscreen to generate the predetermined tilt angle of the portable electronic device.

8. The method of claim 6, wherein the repositioning step repositions the portable electronic device using the rocker base.

9. The method of claim 6, wherein the tilt sensor is located in an upper portion of the rocker base of the portable electronic device.

10. The method of claim 6, wherein the portable electronic device is a mobile phone, personal digital assistant, personal digital assistant, handheld game console or digital camera.

11. A storage medium having stored thereon instructions that, when executed by a processor, causes the processor to perform a method for repositioning a portable electronic device, the portable electronic device comprising a touchscreen, a tilt sensor, a rocker base and a motor installed in the rocker base, the method comprising:

setting a predetermined tilt angle range of the portable electronic device;

controlling the motor to drive the portable electronic device to reposition the portable electronic device to be within the predetermined tilt angle range;

receiving a current tilt angle of the portable electronic device by the tilt sensor; and limiting the tilt angle of the portable electronic device to be within the predetermined tilt angle range.

12. The storage medium of claim 11, wherein the method further comprising receiving at least one contact on the touchscreen to generate the predetermined tilt angle of the portable electronic device.

13. The storage medium of claim 11, wherein the repositioning step repositions the portable electronic device using the rocker base.

14. The storage medium of claim 11, wherein the tilt sensor is located in an upper portion of the rocker base of the portable electronic device.

15. The storage medium of claim 11, wherein the portable electronic device is a mobile phone, personal digital assistant, personal digital assistant, handheld game console or digital camera.

* * * * *